United States Patent
Funamizu et al.

(10) Patent No.: US 10,298,836 B2
(45) Date of Patent: May 21, 2019

(54) IMAGE SENSOR AND IMAGE-CAPTURING APPARATUS

(71) Applicant: NIKON CORPORATION, Tokyo (JP)

(72) Inventors: Wataru Funamizu, Yokohama (JP); Kazuya Okamoto, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 12 days.

(21) Appl. No.: 15/717,078

(22) Filed: Sep. 27, 2017

(65) Prior Publication Data

US 2018/0020153 A1    Jan. 18, 2018

Related U.S. Application Data

(63) Continuation of application No. PCT/JP2016/060281, filed on Mar. 29, 2016.

(30) Foreign Application Priority Data

Mar. 30, 2015  (JP) ................................. 2015-068417

(51) Int. Cl.
*H04N 5/225* (2006.01)
*H04N 5/232* (2006.01)
*H04N 5/369* (2011.01)

(52) U.S. Cl.
CPC ....... *H04N 5/23212* (2013.01); *H04N 5/2256* (2013.01); *H04N 5/3696* (2013.01)

(58) Field of Classification Search
CPC . H04N 5/23212; H04N 5/3696; H04N 5/2256
See application file for complete search history.

(56) References Cited

U.S. PATENT DOCUMENTS

| | | | |
|---|---|---|---|
| 7,952,690 B2 | 5/2011 | Cauquy et al. | |
| 8,139,116 B2 * | 3/2012 | Murayama | H01L 27/14837 348/135 |

(Continued)

FOREIGN PATENT DOCUMENTS

| | | |
|---|---|---|
| JP | S63-17482 U | 2/1988 |
| JP | H03-189584 A | 8/1991 |

(Continued)

OTHER PUBLICATIONS

Jun. 21, 2016 Search Report issued in International Patent Application No. PCT/JP2016/060281.

(Continued)

*Primary Examiner* — Chia Wei A Chen
*Assistant Examiner* — John H. Morehead, III
(74) *Attorney, Agent, or Firm* — Oliff PLC

(57) ABSTRACT

An image sensor includes: a first light-receiving unit that: receives a modulated optical signal having being reflected on an image-capturing target and including a modulated component with an intensity modulated at a predetermined modulation frequency; and outputs a first electrical signal; a second light-receiving unit that: receives a reference optical signal with an intensity modulated in synchronization with the modulated optical signal; and outputs a second electrical signal; and a detecting unit that: is provided to a substrate stacked on a substrate including the first light-receiving unit; refers to the second electrical signal; and detects, from the first electrical signal, a third electrical signal corresponding to the modulated component.

16 Claims, 12 Drawing Sheets

(56) References Cited

U.S. PATENT DOCUMENTS

| | | | |
|---|---|---|---|
| 9,164,030 B2 * | 10/2015 | Oda | G01N 21/3581 |
| 9,621,827 B2 | 4/2017 | Mabuchi et al. | |
| 10,129,497 B2 | 11/2018 | Iwabuchi et al. | |
| 2008/0218608 A1 * | 9/2008 | Rossi | H01L 27/14609 |
| | | | 348/243 |
| 2008/0218609 A1 * | 9/2008 | Blanquart | H04N 5/361 |
| | | | 348/243 |
| 2008/0218615 A1 * | 9/2008 | Huang | H04N 5/2176 |
| | | | 348/294 |
| 2010/0091144 A1 * | 4/2010 | Hidehiko | H04N 5/3577 |
| | | | 348/243 |
| 2012/0218448 A1 | 8/2012 | Ueno et al. | |
| 2013/0057699 A1 | 3/2013 | Ooki | |
| 2014/0263962 A1 * | 9/2014 | Ahn | H01L 27/14618 |
| | | | 250/208.1 |
| 2015/0162925 A1 * | 6/2015 | Lee | H03M 1/1295 |
| | | | 250/208.1 |
| 2017/0302859 A1 * | 10/2017 | Nakanishi | H01L 27/14 |

FOREIGN PATENT DOCUMENTS

| | | |
|---|---|---|
| JP | H04-275785 A | 10/1992 |
| JP | 2000-241134 A | 9/2000 |
| JP | 2001-264014 A | 9/2001 |
| JP | 2001-268445 A | 9/2001 |
| JP | 2002-323563 A | 11/2002 |
| JP | 2004-264116 A | 9/2004 |
| JP | 2008-20261 A | 1/2008 |
| JP | 2010-504509 A | 2/2010 |
| JP | 2012-178693 A | 9/2012 |
| JP | 2012-205217 A | 10/2012 |
| JP | 2013-070030 A | 4/2013 |
| JP | 2013-104784 A | 5/2013 |
| JP | 2014-165520 A | 9/2014 |
| JP | 2014-230242 A | 12/2014 |
| JP | 2016-45161 A | 4/2016 |
| WO | 2006/129762 A1 | 12/2006 |
| WO | 2010/139609 A1 | 12/2010 |
| WO | 2013/176007 A1 | 11/2013 |

OTHER PUBLICATIONS

Jan. 8, 2019 Office Action issued in Japanese Application No. 2017-510070.

* cited by examiner

IMAGE SENSOR AND IMAGE-CAPTURING APPARATUS

The contents of the following Japanese and International patent applications are incorporated herein by reference:
NO. 2015-068417 filed on Mar. 30, 2015, and
NO. PCT/JP2016/060281 filed on Mar. 29, 2016.

BACKGROUND

1. Technical Field

The present invention relates to an image sensor and an image-capturing apparatus.

2. Related Art

There is a method of capturing an image of an image-capturing target by illuminating it with modulated illumination light and performing lock-in detection of reflected light (please see Patent Document 1, for example).

Patent Document 1: Japanese Patent Application Publication No. 2012-205217

If the area of an image sensor is increased, image-capturing quality is degraded in some cases due to signal delay, attenuation or the like being caused within the sensor.

A first aspect of the present invention provides an image sensor including: a first light-receiving unit that: receives a modulated optical signal having being reflected on an image-capturing target and including a modulated component with an intensity modulated at a predetermined modulation frequency; and outputs a first electrical signal; a second light-receiving unit that: receives a reference optical signal with an intensity modulated in synchronization with the modulated optical signal; and outputs a second electrical signal; and a detecting unit that: is provided to a substrate stacked on a substrate including the first light-receiving unit; refers to the second electrical signal; and detects, from the first electrical signal, a third electrical signal corresponding to the modulated component.

A second aspect of the present invention provides an image-capturing apparatus including the image sensor; and an optical system that forms an image of the image-capturing target on the image sensor.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
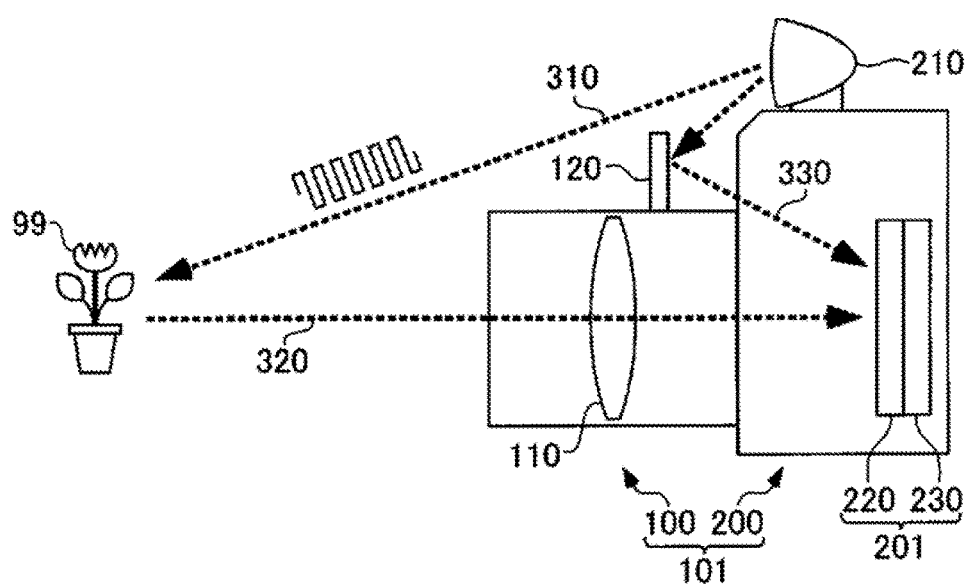
FIG. 1 is a schematic view showing photographing using an image-capturing apparatus 101.

FIG. 1 is a schematic view showing a structure of an image-capturing apparatus 101. The image-capturing apparatus 101 includes a lens unit 100 and a camera body 200.

The lens unit 100 has an optical system 110 and a light-guide member 120. The optical system 110 forms, on an image sensor 201 disposed in the camera body 200, an optical image of an image-capturing target 99.

The camera body 200 has a modulated optical signal generating unit 210 and the image sensor 201. The modulated optical signal generating unit 210 generates a modulated optical signal 310 directed in the forward direction of the image-capturing apparatus 101, which corresponds to the leftward direction as seen in the figure. The modulated optical signal 310 generated by the modulated optical signal generating unit 210 includes a modulated component with an intensity modulated at a predetermined modulation frequency. The modulated optical signal 310 emitted from the modulated optical signal generating unit 210 is, after being reflected on the image-capturing target 99, passes through the optical system 110 of the lens unit 100 and enters the camera body 200 as reflected light 320.

If focused on the image-capturing target 99, the optical system 110 forms a vivid optical image of the image-capturing target 99 on a light-receiving surface of the light-receiving unit 220 in the image sensor 201. Thus, the image-capturing apparatus 101 can acquire a vivid image of the image-capturing target 99 based on an electrical signal output by the image sensor 201. An image of the image-capturing target 99 may be either a still image or a moving image.

The image sensor 201 has a light-receiving unit 220 and a detecting unit 230. The light-receiving unit 220 receives the reflected light 320 received through the optical system 110 of the lens unit 100, and outputs an electrical signal corresponding to the optical intensity of the received reflected light 320. The detecting unit 230 detects information about the image-capturing target 99 based on the output of the light-receiving unit 220. Here, the information detected by the detecting unit 230 about the image-capturing target 99 may be for example an optical image of the image-capturing target 99. Also, the information may be the distance from the image-capturing apparatus 101 to the image-capturing target 99.

In the image-capturing apparatus 101, part of an optical signal emitted by the modulated optical signal generating unit 210 is reflected on the light-guide member 120 to directly enter the camera body 200. The optical signal having entered the camera body 200 enters the light-receiving unit 220 of the image sensor 201. In contrast to the optical signal having directly entered the image sensor 201 from the modulated optical signal generating unit 210 guided by the light-guide member 120, an optical signal reflected on the image-capturing target 99 enters the image sensor 201 after a delay corresponding to the distance between the image-capturing apparatus 101 and the image-capturing target 99.

The light-guide member 120 may be formed of a reflective element that is reflective to part of a luminous flux of an optical signal with high reflectance. Also, the light-guide member 120 may be formed of a half mirror that is reflective to part of an emitted optical signal and is transmissive to part of the emitted optical signal. Furthermore, the light-guide member 120 may be formed of a dichroic mirror or the like that is reflective to a partial band of an emitted optical signal. Still furthermore, the light-guide member 120 may be formed using a light-guide element such as an optical fiber or an optical waveguide.

In any case, the light-guide member 120 lowers part of the optical intensity of an optical signal. Thus, the light-guide member 120 is preferably arranged being inserted into a luminous flux of an optical signal at a position where the modulated optical signal generating unit 210 cannot be seen directly from the image-capturing target 99 side.

In this manner, in the image-capturing apparatus 101, the image sensor 201 receives, by the image sensor 201 and as a reference optical signal 330, part of the modulated optical signal 310 generated by the modulated optical signal generating unit 210 through an optical path including the light-guide member 120. Thus, the reference optical signal 330 also includes a modulated component with an intensity modulated at a given modulation frequency.

Also, the image sensor 201 receives, as the reflected light 320 reflected on the image-capturing target 99, another part of the modulated optical signal 310 through an optical path including the optical system 110 for image-capturing. Similar to the initial modulated optical signal 310, the reflected light 320 received by the image sensor 201 also includes a modulated component with an intensity modulated at a given modulation frequency.

When having received the reflected light 320 and the reference optical signal 330, the image sensor 201 calculates the distance between the image-capturing apparatus 101 and the image-capturing target 99 based on the phase shift between the reflected light 320 and the reference optical signal 330, for example. Also, it selectively detects the reflected light 320 of the modulated optical signal 310 in light having been emitted by the image-capturing target 99 and entered the lens unit 100 to form a high sensitivity optical image of the image-capturing target 99.

It takes time for the reference optical signal 330 generated in the modulated optical signal generating unit 210 to reach the image sensor 201, so a phase shift is also generated between the initial modulated optical signal 310 and the reference optical signal 330 received by the image sensor 201. However, because the modulated optical signal generating unit 210, the light-guide member 120 and the image sensor 201 are respectively fixed to the image-capturing apparatus 101, time required for the reference optical signal 330 to reach the image sensor 201 is known. Thus, the distance to the image-capturing target 99 can be accurately chosen by correcting the calculated value.

Figure 2:
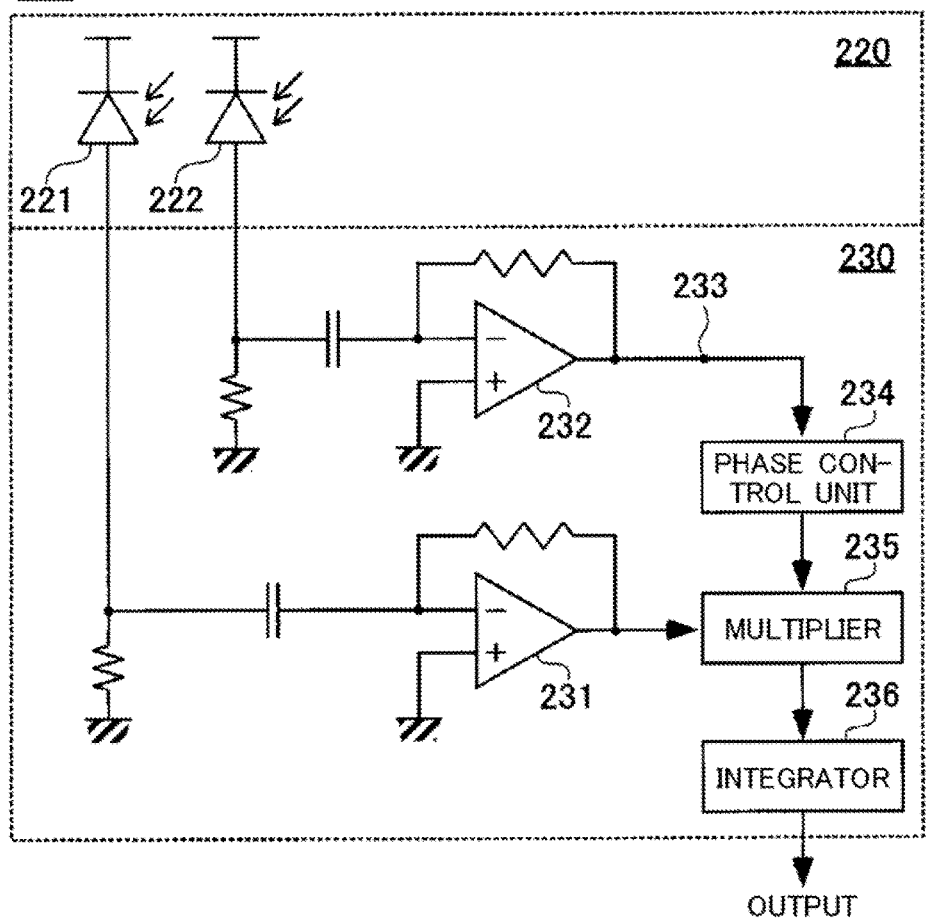
FIG. 2 is a circuit diagram showing a detecting unit 230.

FIG. 2 is a circuit diagram of the image sensor 201. The image sensor 201 has the light-receiving unit 220 and the detecting unit 230 that are integrated by stacking substrates.

The light-receiving unit 220 has a main pixel 221 as a first light-receiving unit and a sub pixel 222 as a second light-receiving element. The main pixel 221 and the sub pixel 222 can be formed of photodiodes disposed on a single semiconductor substrate.

Figure 3:
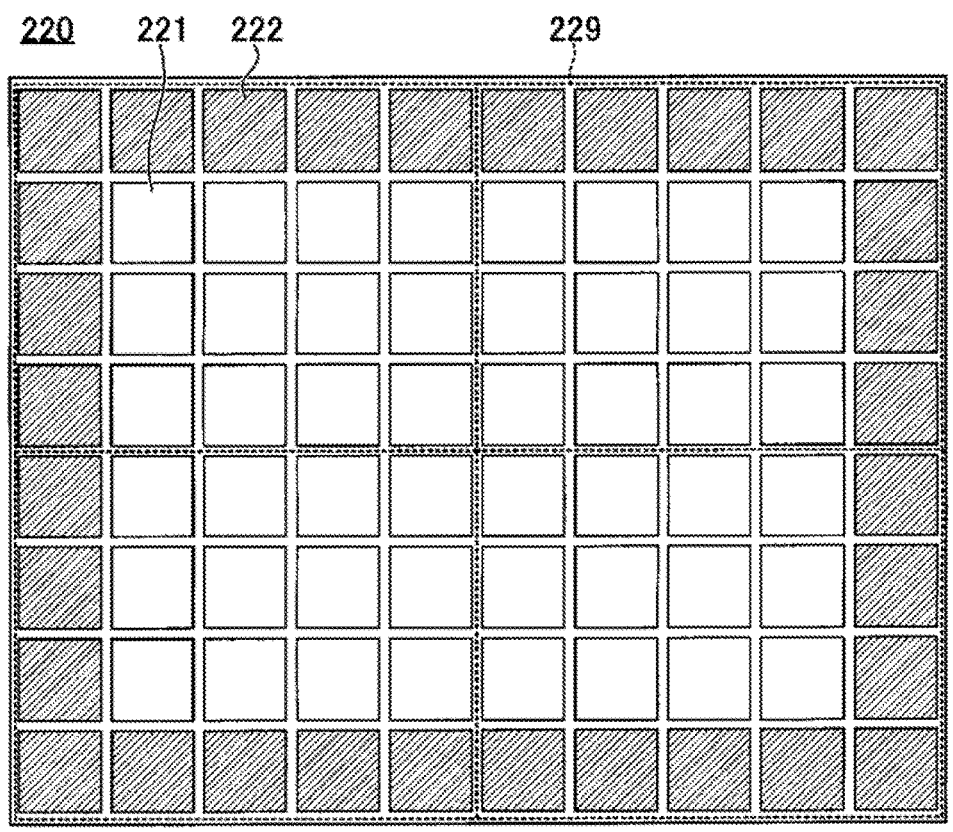
FIG. 3 is a schematic view showing an example of the region layout of a light-receiving unit 220.

FIG. 3 is a schematic view showing an example of the layout in the light-receiving unit 220. A light-receiving surface to receive an optical signal in the light-receiving unit 220 can be divided into a plurality of light-receiving regions 229. Each of the light-receiving regions 229 includes a plurality of the main pixels 221 and a plurality of sub pixels 222.

In each of the light-receiving regions 229, the main pixels 221 are disposed in a region where incoming light from the optical system 110 illuminates the light-receiving unit 220, for example a region including the center of the light-receiving surface of the light-receiving unit 220.

Thereby, the main pixel 221 receives the reflected light 320 that results from the modulated optical signal 310 emitted from the modulated optical signal generating unit 210 being reflected on the image-capturing target 99, and generates an electrical charge corresponding to the optical intensity of the reflected light 320.

Also, in each of the light-receiving regions 229, the sub pixels 222 are disposed outside a region where incoming light from the optical system 110 illuminates the light-receiving unit 220, for example a peripheral part in the light-receiving unit 220. The light-guide member 120 guides the reference optical signal 330, limiting its target region to the region where the sub pixels 222 are disposed. Thereby, the reference optical signal 330 that has resulted from the modulated optical signal 310 emitted from the modulated optical signal generating unit 210 being guided by the light-guide member 120 is received to generate an electrical charge corresponding to the optical intensity of the reference optical signal 330.

In the illustrated example, the number of the main pixels 221 and the number of the sub pixels 222 are different from each other both in each of the light-receiving regions 229 and in the entire light-receiving unit 220. Thus, in the image sensor 201, one sub pixel 222 may be associated with a plurality of main pixels 221.

Also, in the illustrated image sensor 201, any of signals obtained from a plurality of the sub pixels 222 may be associated with a main pixel 221. Furthermore, even if not all of the sub pixels 222 received the reference optical signal 330, the reference optical signal 330 received by some sub pixels 222 may be used for demodulation of the reflected light 320 received by all the main pixels 221.

Referring again to FIG. 2, the detecting unit 230 has a pair of operational amplifiers 231, 232, a phase control unit 234, a multiplier 235 and an integrator 236. One of the operational amplifiers, the operational amplifier 231, is AC-coupled with the main pixel 221, and has an inverting input and an output coupled via a resistive load. Thereby, the operational amplifier 231 forms a current/voltage converter that converts an output signal of the main pixel 221 into a voltage signal. Thus, the one of the operational amplifiers, the operational amplifier 231, outputs a first electrical signal corresponding to the optical intensity reflected light 320 that has been reflected on the image-capturing target 99 and entered it through the optical system 110.

The other of the operational amplifiers, the operational amplifier 232, is AC-coupled with the sub pixel 222, and has an inverting input and an output coupled via a resistive load. Thereby, the operational amplifier 232 forms a current/voltage converter that converts an output signal of the sub pixel 222 into a voltage signal. Thus, the other of the operational amplifiers, the operational amplifier 232, outputs a second electrical signal corresponding to the optical intensity of the reference optical signal 330.

The outputs from the pair of operational amplifiers 231, 232 are input to the multiplier 235 via the phase control unit 234. An output of a multiplication process in the multiplier 235 undergoes an integration process in the integrator 236 and is treated as an output of the detecting unit 230. The phase control unit 234 varies the phase of a reference signal to be input from the operational amplifier 232 to the multiplier 235.

As has already been explained, the modulated optical signal 310 generated by the modulated optical signal generating unit 210 is modulated at a predetermined modulation frequency. Also, because the reference optical signal 330 is part of the modulated optical signal 310, it includes a modulated component modulated at the modulation frequency. Thus, by demodulating the modulated component from the reference optical signal 330 to generate a reference signal, the reflected light 320 can be synchronously detected.

Furthermore, the detecting unit 230 acquires a reference signal from a sub pixel 222 disposed in the light-receiving region 229 where a main pixel 221 which is a first light-receiving unit is also disposed to perform synchronous detection. Thus, the detecting unit 230 outputs a third electrical signal including information related to the image-capturing target 99.

In this manner, because in the image sensor 201, a reference signal is supplied from a signal obtained from a sub pixel 222 that receives the reference optical signal 330, the length of a reference signal propagation path can be kept short within a shorter-length range than a predetermined distance even if the image sensor 201 is increased in size or formed to have high resolution. Thus, even if the light-receiving unit 220 is increased in size or formed to have high resolution, the detecting unit 230 can acquire a reference signal that is less attenuated and less delayed, and can perform synchronous detection with high accuracy.

Figure 4:
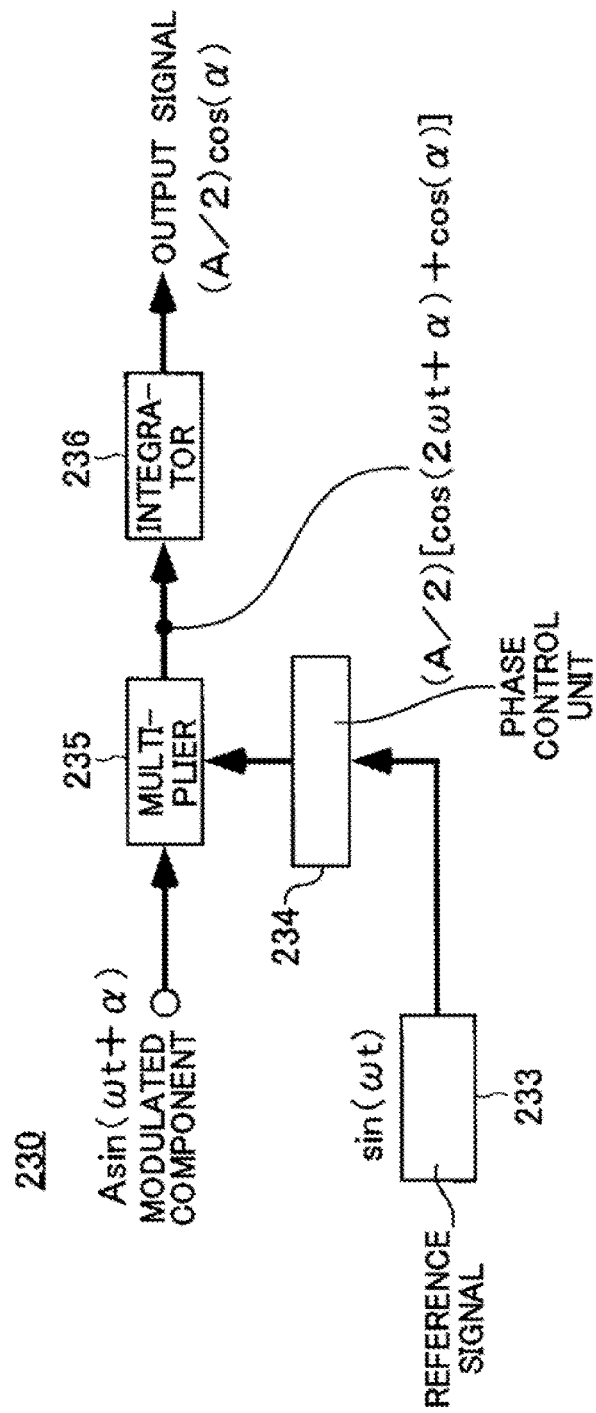
FIG. 4 is a figure for explaining an operation of the detecting unit 230.

FIG. 4 is a figure for explaining an operation of the detecting unit 230 of the image sensor 201. In the detecting unit 230, due to DC connection, DC components are eliminated from or reduced in an electrical signal input to the operational amplifier 231 through a main pixel 221. Thus, the multiplier 235 receives an electrical signal corresponding to a modulated component A Sin($\omega$t+$\alpha$) of the reflected light 320 modulated at a modulation frequency $\omega$t. Here, a is the phase shift amount of the reflected light 320 relative to the phase of the reference optical signal 330 treated as the reference.

In the detecting unit 230, due to AC connection, DC components are eliminated from or reduced in an electrical signal input to the operational amplifier 232 through a sub pixel 222. Thus, the multiplier 235 receives a reference electrical signal 233 corresponding to a variation component Sin($\omega$t) of the reference optical signal 330 modulated at the modulation frequency $\omega$t synchronized with the reflected light 320. It is assumed that the phase shift generated due to time required for the reference optical signal 330 to reach the image sensor 201 from the modulated optical signal generating unit 210 has been resolved by correction.

The multiplier 235 outputs a result [(A/2)[Cos(2 $\omega$t+$\alpha$)+ Cos($\alpha$)]] of multiplication of the modulated component A Sin($\omega$t+$\alpha$) of the reflected light 320 and the variation component Sin($\omega$t) of the reference optical signal 330 that have been input thereto. It can be known that the output of the multiplier 235 includes the direct current signal [(A/2) Cos($\alpha$)] and the secondary higher harmonic [(A/2)Cos(2 $\omega$t)] of the reflected light 320.

Thus, by eliminating the secondary higher harmonic [(A/2)Cos(2$\omega$t)] by the integrator 236 formed of a lowpass filter, for example, the direct current signal [(A/2)Cos(0)] is obtained. In this manner, the detecting unit 230 can receive incoming light including also light other than the reflected light 320 of the modulated optical signal 310, and selectively amplify the reflected light 320 reflected on the image-capturing target 99 illuminated with the modulated optical signal 310.

The DC level of an electrical signal output by the detecting unit 230 lowers as the phase shift between the reflected light 320 and the reference optical signal 330 increases. Thus, by resolving the phase shift between the reflected light 320 and the reference optical signal 330 by varying the phase of the reference signal input to the multiplier 235 by the phase control unit 234, it becomes possible to detect the reflected light 320 with high selectivity and amplify it.

Also, based on the amount of phase correction on the reference optical signal 330 by the phase control unit 234 in a state where the output level of the detecting unit 230 has become highest, the phase difference between the reflected light 320 and the reference optical signal 330 can be calculated. The phase difference corresponds to a length of time that elapses after the reflected light 320 is emitted from the modulated optical signal generating unit 210 and received by the image sensor 201. Thus, based on the phase difference between the reflected light 320 and the reference optical signal 330, the distance between the image-capturing apparatus 101 and the image-capturing target 99 can be calculated. In the image-capturing apparatus 101, it is possible to focus the optical system 110 of the lens unit 100 on the image-capturing target 99 according to the calculated distance to the image-capturing target 99.

Figure 5:
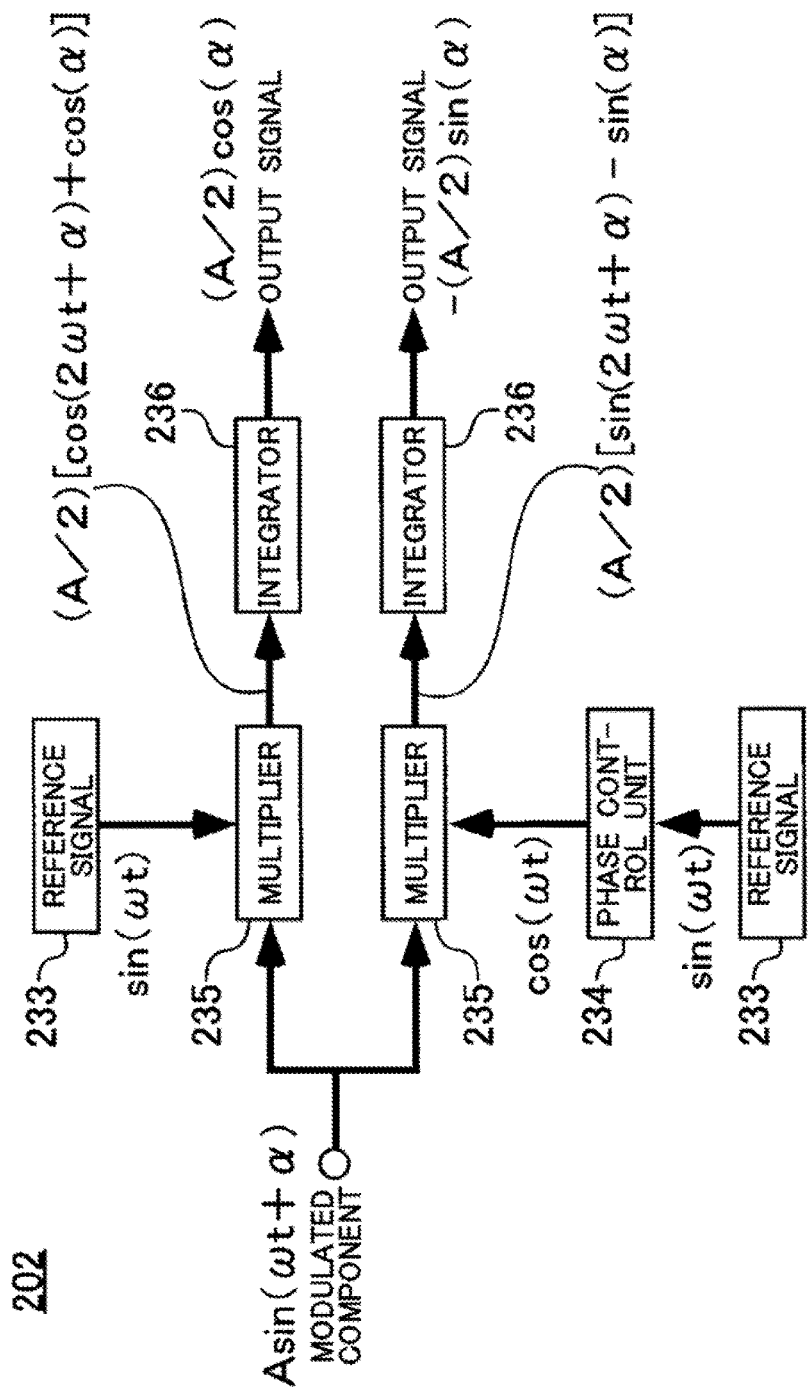
FIG. 5 is a figure for explaining another operation of the detecting unit 230.

FIG. 5 is a figure for explaining another operation of the detecting unit 230. In the illustrated detecting unit 230, a detection process by the multiplier 235 and the integrator 236 is performed in two systems. Here, in one of the systems, the phase of a reference signal is altered by the phase control unit 234. Thereby, in the two process systems, the detection process is performed using the reference signals [sin($\omega$t)] and [cos($\omega$t)) having the phases that are orthogonal to each another.

Thereby, [{cos(2$\omega$t+$\alpha$)+cos($\alpha$)}/2] is output from one multiplier 235, and [{sin(2$\omega$t+$\alpha$)−sin($\alpha$)}/2] is output from the other multiplier 235. Because the respective outputs undergo integration processes by the integrators 236 such as lowpass filters, and harmonic components are eliminated therefrom, [cos($\alpha$)/2] and [−sin($\alpha$)/2] are respectively output from the detecting unit 230. Thus, based on tan(a) obtained from these values, the phase difference of the reflected light 320 relative to the reference optical signal 330 can be calculated.

Because the thus-calculated phase difference corresponds to time required for the reflected light 320 to be reflected on the image-capturing target 99 and received by the light-receiving unit 220, the image sensor 201 can be used as a range finder that measures the distance between the image-capturing apparatus 101 and the image-capturing target 99. Thus, in the image-capturing apparatus 101, the optical system 110 of the lens unit 100 can be focused based on an output of the image sensor 201.

Figure 6:
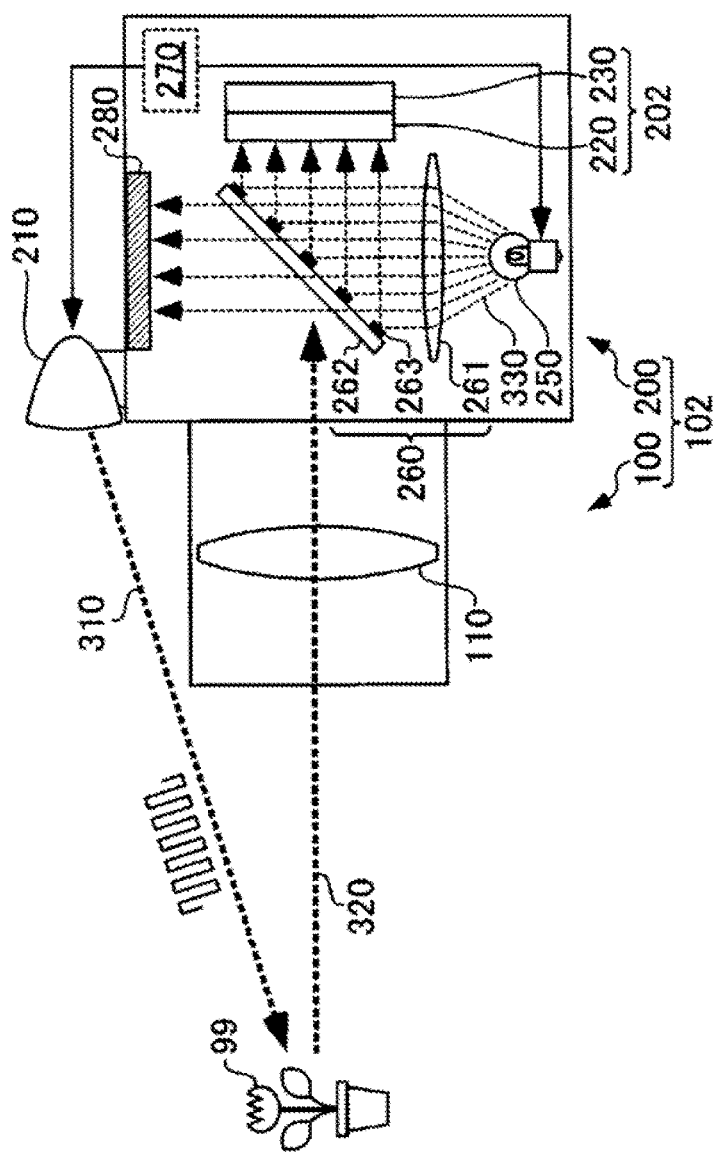
FIG. 6 is a schematic view showing another image-capturing apparatus 102.

FIG. 6 is a schematic view showing another image-capturing apparatus 102. The image-capturing apparatus 102 has the same structure as that of the image-capturing apparatus 101 shown in FIG. 1 except for portions that are explained next. Elements in the image-capturing apparatus 102 that the image-capturing apparatus 102 and the image-capturing apparatus 101 have in common are given the same reference numerals, and the same explanation is not repeated.

The image-capturing apparatus 102 has a different structure from that of the image-capturing apparatus 101 in that the light-guide member 120 is removed from the image-capturing apparatus 101, and the image-capturing apparatus 102 includes a reference optical signal generating unit 250, a light-guide unit 260, a synchronization control unit 270 and a light absorber 280. An image sensor 202 provided to the image-capturing apparatus 102 also has a different structure from that of the image sensor 201 in the image-capturing apparatus 101, but the difference is described later referring to FIG. 9.

In the image-capturing apparatus 102, the reference optical signal generating unit 250 is disposed separate from the modulated optical signal generating unit 210 and inside the camera body 200, and exclusively generates the reference optical signal 330. Thus, the reference optical signal generating unit 250 may generate the reference optical signal 330 in a different band from that of the modulated optical signal 310 generated by the modulated optical signal generating unit 210.

For example, the modulated optical signal generating unit 210 may generate the modulated optical signal 310 in the visible light band, and the reference optical signal generating unit 250 may generate the reference optical signal 330 in the infrared band. Also, for example, the modulated optical signal generating unit 210 may generate the modulated optical signal 310 in the terahertz light band, and the reference optical signal generating unit 250 may generate the reference optical signal 330 in the infrared or visible light band.

Furthermore, the reference optical signal generating unit 250 may generate the reference optical signal 330 having a wavelength in the absorbing band of water molecules. Because water molecules are always present in the atmosphere and absorbing light in its absorbing band, they are in a calm state for the band in the atmosphere. Thus, the image sensor 202 can detect the reference optical signal 330 generated by the reference optical signal generating unit 250 at a high SN ratio. For a similar reason, the reference optical signal generating unit 250 may generate the reference optical signal 330 having a wavelength in the absorbing band of oxygen molecules.

In this manner, by separating the reference optical signal generating unit 250 from the modulated optical signal generating unit 210, the band in which the wavelength of the reference optical signal 330 is in can be made different from that for the wavelength of the modulated optical signal 310. Thereby, it becomes easy for the image sensor 201 to distinguish between the reflected light 320 of the modulated optical signal 310 and the reference optical signal generating unit 250, so it can perform a process suited for each of them.

Also, in the image-capturing apparatus 102, the reference optical signal generating unit 250 is disposed at the bottom of the camera body 200, and radiates the reference optical signal 330 in the upward direction as seen in the figure. The reference optical signal generating unit 250 shares the synchronization control unit 270 with the modulated optical signal generating unit 210 and is driven by the synchronization control unit 270. Thereby, the reference optical signal 330 generated by the reference optical signal generating unit 250 has an intensity modulated in synchronization with the modulated optical signal 310 generated by the modulated optical signal generating unit 210.

Furthermore, the image-capturing apparatus 102 includes the light-guide unit 260 inside the camera body 200. The light-guide unit 260 has a collimating lens 261, a transparent plate 262 and a reflection film 263.

The collimating lens 261 is disposed between the optical path of the reflected light 320 having entered the image-capturing apparatus 102 and the reference optical signal generating unit 250. The collimating lens 261 converts the reference optical signal 330 emitted radially from the reference optical signal generating unit 250 into parallel beams that propagate in a vertical direction from the bottom to the top as seen in the figure.

The transparent plate 262 is positioned above the collimating lens 261 as seen in the figure. Also, the transparent plate 262 is disposed on the optical path of the incoming reflected light 320 and in front of the image sensor 202. Furthermore, the transparent plate 262 is disposed inclined relative both to the reflected light 320 and the reference optical signal 330.

The transparent plate 262 has the reflection film 263 that is partially formed. The reflection film 263 can be formed of, for example, a dielectric multi-layer film formed by alternately depositing dielectric materials having different refractive indexes. In a region of the transparent plate 262 in which the reflection film 263 is disposed, the reference optical signal 330 emitted toward the transparent plate 262 is reflected at high efficiency. However, also in a region in which the reflection film 263 is disposed, light with a different wavelength from that of the reference optical signal 330 is transmitted at a low loss level.

If the reference optical signal 330 emitted from a lower portion as seen in the figure is reflected on the reflection film 263 of the transparent plate 262, the reflected reference optical signal 330 enters the light-receiving unit 220 of the image sensor 202 with its propagation direction being changed into the horizontal direction as seen in the figure. Thus, by making the arrangement of the reflection film 263 in the transparent plate 262 correspond to the arrangement of sub pixels 222 in the image sensor 202, the reference optical signal 330 can be caused to enter the sub pixels 222 selectively.

In a region in the transparent plate 262 where the reflection film 263 is not formed, the reference optical signal 330 also is allowed to pass therethrough at a low loss level. If the reference optical signal 330 emitted from the reference optical signal generating unit 250 positioned below the transparent plate 262, as seen in the figure, is allowed to pass through the transparent plate 262, the reference optical signal 330 that has passed therethrough is absorbed by the light absorber 280 disposed at an upper portion, as seen in the figure, and disappears. The light absorber 280 can be formed of a dielectric multi-layer film, light-blocking lines, or the like.

Figure 7:
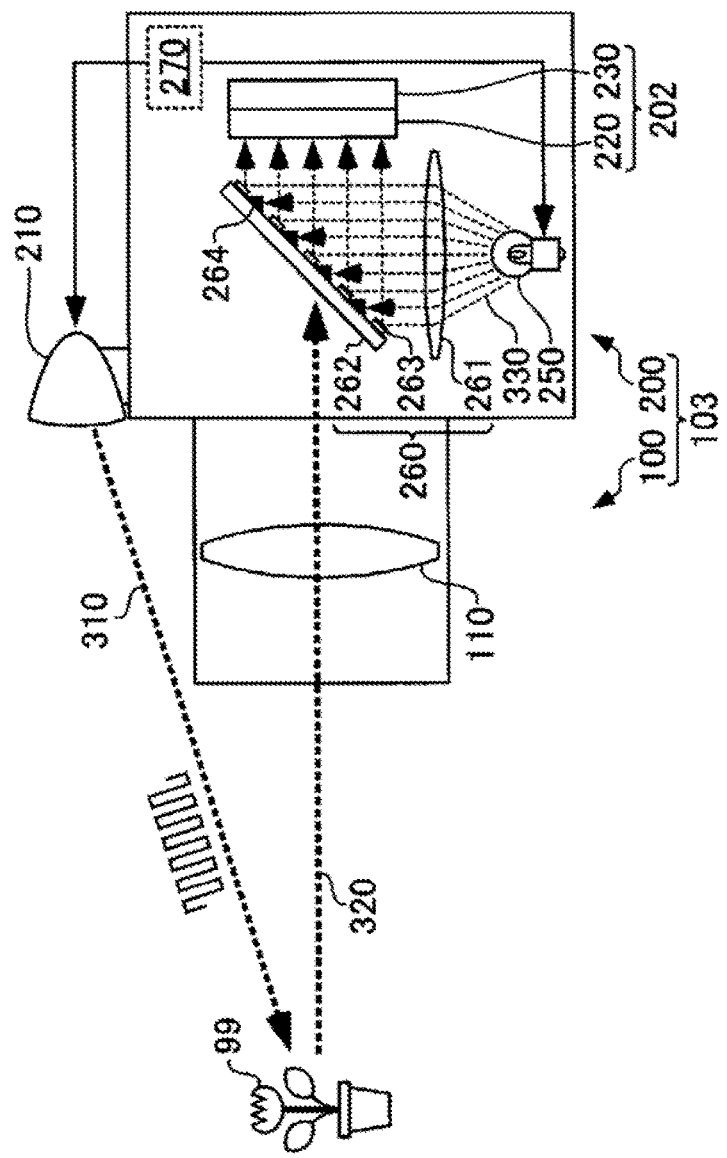
FIG. 7 is a schematic view showing a structure of an image-capturing apparatus 103.

FIG. 7 is a schematic view showing a structure of an image-capturing apparatus 103. The image-capturing apparatus 103 has the same structure as that of the image-capturing apparatus 102 shown in FIG. 6 except for portions that are explained next. Elements in the image-capturing apparatus 103 that the image-capturing apparatus 103 and the image-capturing apparatus 102 have in common are given the same reference numerals, and the same explanation is not repeated.

The image-capturing apparatus 103 has a different structure in that it includes a light absorbing surface 264 in place of the light absorber 280 in the image-capturing apparatus 102. The light absorbing surface 264 is formed on a surface of the transparent plate 262 facing the reference optical signal generating unit 250. The light absorbing surface 264 can be formed of, for example, a dielectric multi-layer film having adjusted film thicknesses of respective layers. The light absorbing surface 264 is formed in a region not provided with the reflection film 263 that is reflective to the reference optical signal 330.

Thereby, in the image-capturing apparatus 103, in a region where the reference optical signal 330 is not reflected on the reflection film 263, the reference optical signal 330 is absorbed by the light absorbing surface 264, but does not reach the light-receiving unit 220. Thus, in the light-receiving unit 220, while sub pixels 222 receive the reference optical signal 330, main pixels 221 do not receive the reference optical signal 330.

Figure 8:
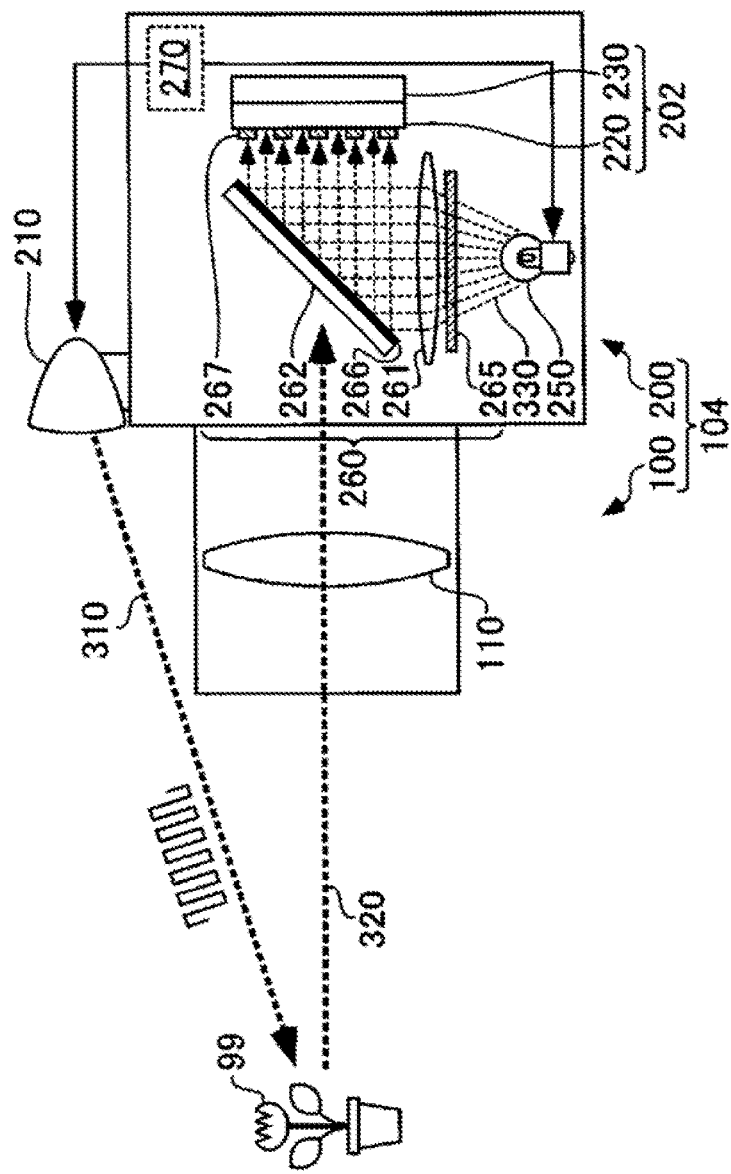
FIG. 8 is a schematic view showing a structure of an image-capturing apparatus 104.

FIG. 8 is a schematic view showing a structure of an image-capturing apparatus 104. The image-capturing apparatus 104 has the same structure as that of the image-capturing apparatus 102 shown in FIG. 6 except for portions that are explained next. Elements in the image-capturing apparatus 104 that the image-capturing apparatus 104 and the image-capturing apparatus 102 have in common are given the same reference numerals, and the same explanation is not repeated.

The image-capturing apparatus 104 has a unique structure in that in the light-guide unit 260, it has color filters 265, 267 and a reflection film 266 in place of the reflection film 263 and the light absorber 280 in the image-capturing apparatus 102. One of the color filters, the color filter 265, is disposed in the reference optical signal generating unit 250 and the transparent plate 262. The reflection film 266 is disposed on a face of the transparent plate 262 facing the reference optical signal generating unit 250. In the light-receiving unit 220, surfaces in which the other of the color filters, the color filter 267, is disposed are limited to surfaces of sub pixels 222.

The color filter 265 disposed on the reference optical signal generating unit 250 side blocks optical signals other than those in a predetermined band. Thus, among components of the reference optical signal 330 generated by the reference optical signal generating unit 250, only those that are in the band to which the color filter 265 is transmissive are emitted toward the transparent plate 262.

The reflection film 266 is reflective to the reference optical signal emitted from the reference optical signal generating unit 250 toward the transparent plate 262 and causes it to enter the light-receiving unit 220. The reflection film 266 may be formed of a dielectric multi-layer film or the like, and may be a dichroic mirror that is reflective to only components of the reference optical signal 330 that are in the band to which the color filter 265 is transmissive.

The color filter 267 disposed in the light-receiving unit 220 has a characteristic of blocking only components in the band to which the preceding color filter 265 is transmissive. Thereby, the reference optical signal 330 does not enter main pixels 221, but enters only sub pixels 222. The band to which the color filter 265 is transmissive, but that the color filter 267 blocks may be the infrared band, and may be a different band from that of a modulated optical signal received by main pixels 221 in the light-receiving unit 220.

Figure 9:
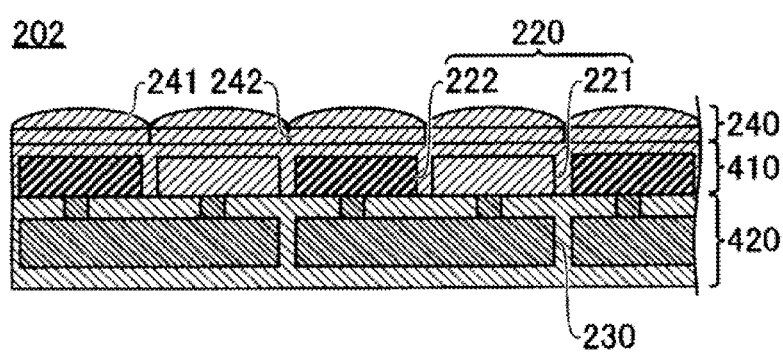
FIG. 9 is a schematic view showing an image sensor 202.

FIG. 9 is a schematic sectional view of the image sensor 202 that may be disposed in the camera body 200 of the image-capturing apparatuses 102 to 104. The image sensor 202 has a first substrate 410 and a second substrate 420 integrated by stacking.

The first substrate 410 has the light-receiving unit 220 including main pixels 221 and sub pixels 222. The main pixels 221 and the sub pixels 222 are disposed alternately in the first substrate 410. In other words, each of the sub pixels 222 is respectively disposed proximate to a corresponding main pixel 221. Because elements and circuits other than the main pixels 221 and the sub pixels 222 are not disposed almost at all in the first substrate 410, the aperture rates of the main pixels 221 and the sub pixels 222 can be increased.

An optical material layer 240 is stacked on a light-entering plane of the first substrate 410 corresponding to an upper surface as seen in the figure. The optical material layer 240 has an on-chip lens 241, and improves the incoming light concentrating rate for the main pixels 221 and the sub pixels 222.

Also, the optical material layer 240 may include an on-chip color filter 242 that suppresses entrance of optical signals in unnecessary bands. For example, a filter to block the band of the reference optical signal 330 may be provided at positions corresponding to the main pixel 221 to suppress the effective sensitivity to the reference optical signal 330 of the main pixel 221. Thereby, it is possible to prevent the reference optical signal 330 from being detected as noises for the main pixels 221.

Also, for example, a filter to block bands other than the band of the reference optical signal 330 may be provided at positions corresponding to the sub pixels 222. Thereby, it is possible to prevent entrance of optical signals other than the reference optical signal 330, which optical signals to become noises for the sub pixels 222.

The second substrate 420 is stacked on the first substrate 410 on the opposite side to the light-entering plane on which the optical material layer 240 is stacked. The second substrate 420 has a plurality of detecting units 230. Each among the plurality of detecting units 230 is connected to a pair of a main pixel 221 and a sub pixel 222. Because the main pixel 221 and the sub pixel 222, and the detecting unit 230 are connected by wires formed in the thickness direction of the first substrate 410 and the second substrate 420, it is possible to prevent the aperture rates of the main pixels 221 and the sub pixels 222 in the first substrate 410 from being lowered due to wires.

In the image sensor 202, the reference optical signal 330 reaches all the sub pixels 222 simultaneously. Thus, even if the image sensor 202 has an increased number of pixels or is increased in size, generation of delays in supply of the reference optical signal 330 among the plurality of detecting units 230 can be prevented. Also, because the reference optical signal 330 reaches all among the plurality of detecting units 230 at the same signal level, variation in operational timing due to attenuation of the reference signal can be prevented even if the image sensor 202 has an increased number of pixels or is increased in size.

In this manner, because in the image sensor 202, a reference signal is supplied from a signal obtained from a sub pixel 222 that receives the reference optical signal 330, the length of a reference electrical signal propagation path can be kept short within a shorter-length range than a predetermined distance even if the image sensor 202 is increased in size or formed to have high resolution. Thus, even if the light-receiving unit 220 is increased in size or formed to have high resolution, the detecting unit 230 can acquire a reference signal that is less attenuated and less delayed, and can perform synchronous detection with high accuracy.

Figure 10:
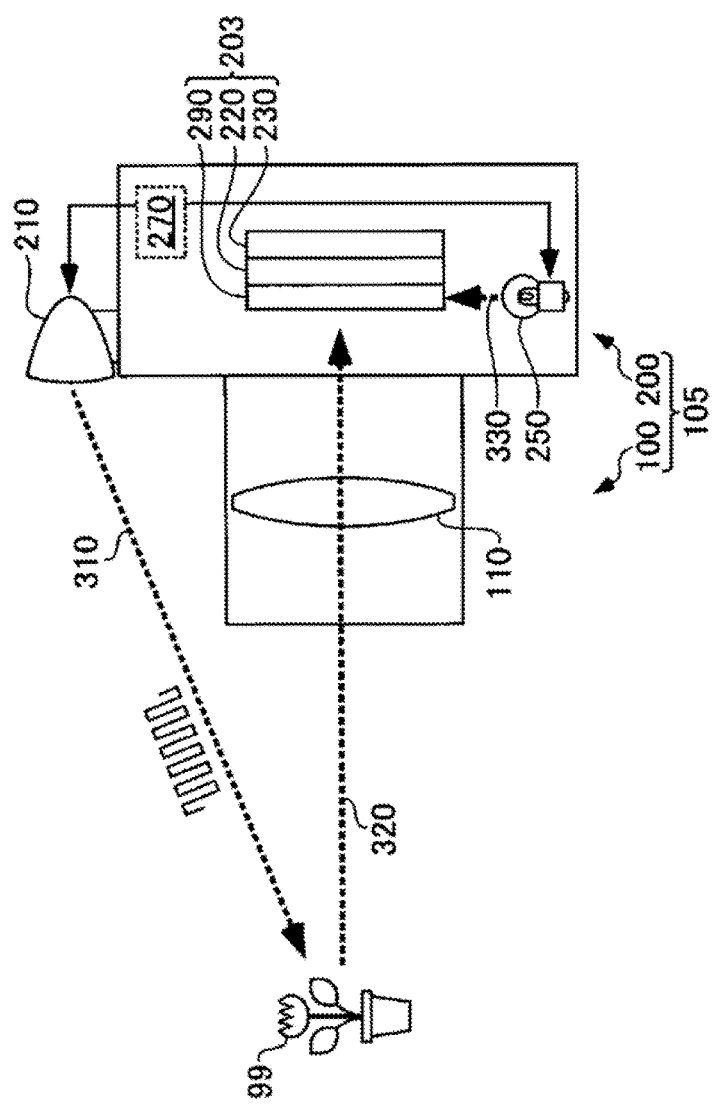
FIG. 10 is a schematic view showing another image-capturing apparatus 105.

FIG. 10 is a schematic view showing still another image-capturing apparatus 105. The image-capturing apparatus 105 has the same structure as that of the image-capturing apparatus 101 shown in FIG. 1 except for portions that are explained next. Elements in the image-capturing apparatus 105 that the image-capturing apparatus 105 and the image-capturing apparatus 101 have in common are given the same reference numerals, and the same explanation is not repeated.

The image-capturing apparatus 105 has a different structure from that of the image-capturing apparatus 101 in that the light-guide member 120 is removed from the image-capturing apparatus 101, and the image-capturing apparatus 105 includes a reference optical signal generating unit 250, a synchronization control unit 270 and a slab-type optical waveguide 290. An image sensor 203 provided to the image-capturing apparatus 105 also has a different structure from that of the image sensor 201 in the image-capturing apparatus 101, but the difference is described later referring to FIG. 11.

In the image-capturing apparatus 105, the reference optical signal generating unit 250 is disposed separate from the modulated optical signal generating unit 210 and inside the camera body 200, and exclusively generates the reference optical signal 330. Thus, the reference optical signal generating unit 250 may generate the reference optical signal 330 in a different band from that of the modulated optical signal 310 generated by the modulated optical signal generating unit 210. Thereby, the reflected light 320 of the modulated optical signal 310 reflected on the image-capturing target 99 and the reference optical signal 330 received for the purpose of generating the reference signal in the detecting unit 230 can be surely distinguished from each other.

In the image-capturing apparatus 105, the reference optical signal generating unit 250 is disposed at the bottom of the camera body 200, and radiates the reference optical signal 330 in the upward direction as seen in the figure. The reference optical signal generating unit 250 shares the synchronization control unit 270 with the modulated optical signal generating unit 210 and is driven by the synchronization control unit 270. Thereby, the reference optical signal 330 generated by the reference optical signal generating unit 250 has an intensity modulated in synchronization with the modulated optical signal 310 generated by the modulated optical signal generating unit 210. The reference optical signal 330 emitted from the reference optical signal generating unit 250 enters the slab-type optical waveguide 290 stacked on a front plane, as seen in the figure, of the image sensor 203 from its edge plane at its lower edge, as seen in the figure.

Figure 11:
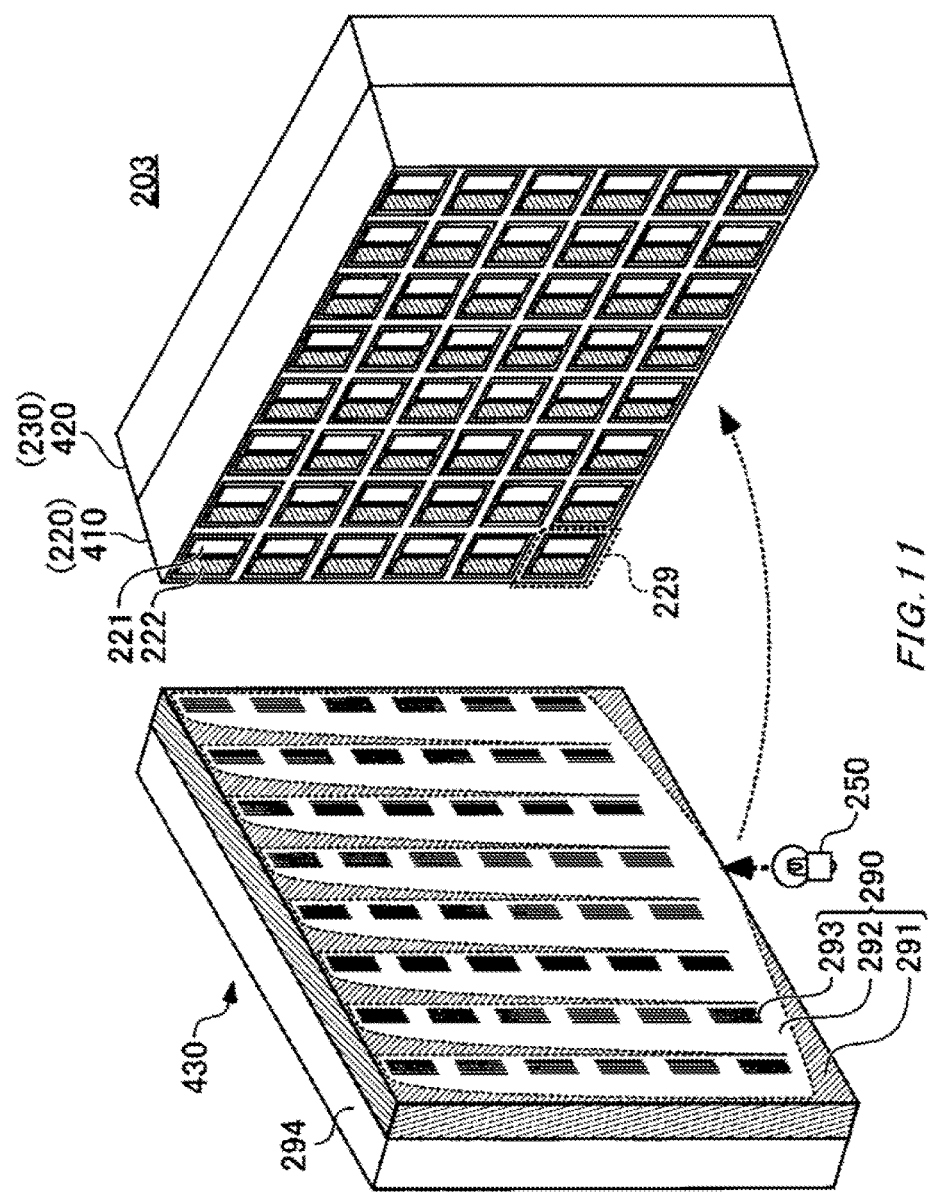
FIG. 11 is a schematic view showing an image sensor 203.

FIG. 11 is a schematic view showing a structure of the image sensor 203 in the image-capturing apparatus 105. The image sensor 203 has a structure obtained by stacking a third substrate 430 having the slab-type optical waveguide 290, in addition to the first substrate 410 and the second substrate 420. FIG. 11 shows a state where the image sensor 203 is opened along the interface between the first substrate 410 and the third substrate 430.

In the image sensor 203, a portion on the right side as seen in the figure in which the first substrate 410 having the light-receiving unit 220 and the second substrate 420 having the detecting unit 230 are stacked has approximately the same structure as that of the image sensor 201 shown in FIG. 1. The image sensor 203 has a distinctive structure in that the third substrate 430 having the slab-type optical waveguide 290 shown on the right side as seen in the figure is stacked further.

The third substrate 430 has the slab-type optical waveguide 290 including a cladding region 291, a core region 292 and a grating 293 formed on one surface of the support substrate 294. The slab-type optical waveguide 290 faces the first substrate 410 in the image sensor 203.

In the slab-type optical waveguide 290, the core region 292 has a higher refractive index than the cladding region 291, and highly efficiently propagates incoming optical signals. The slab-type optical waveguide 290 is formed by injecting a dopant to vary the refractive index to part of a substrate made of quartz glass, silicon, high-purity polyimide-based resin, polyamide-based resin or polyether-based resin or a substrate obtained by deuterating or fluorinating them. The grating 293 is a diffraction element formed on a surface of the core region 292, and can be formed by photo-induced refractive index change, machining and the like.

Figure 12:
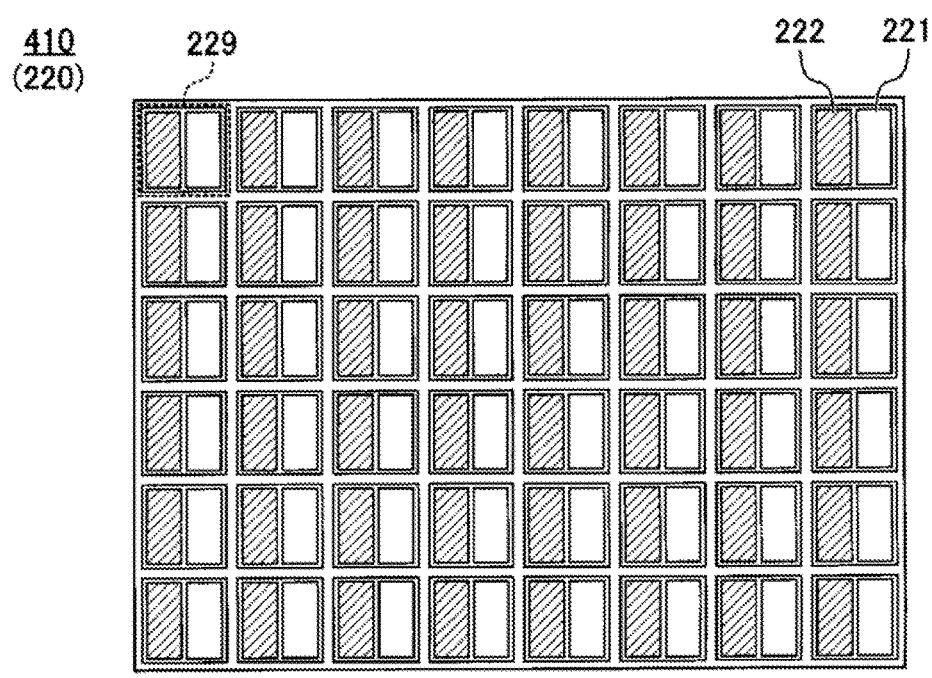
FIG. 12 is a schematic view showing an example of the region layout of the light-receiving unit 220.

FIG. 12 is a figure showing an example of the region layout of the light-receiving unit 220 in the image-capturing apparatus 105. In the illustrated example, a plurality of light-receiving regions 229 are formed in the light-receiving unit 220 with main pixels 221 and sub pixels 222 being paired. The plurality of light-receiving regions 229 are arranged in a matrix on the light-receiving surface of the light-receiving unit 220.

Referring again to FIG. 11, the grating 293 in the image sensor 203 is formed on a surface of the third substrate 430 at a position corresponding to the arrangement of a sub pixel 222 in the first substrate 410. In each grating 293, the refractive index of a medium to propagate optical signals varies periodically, and part of optical signals that are propagated in the core region 292 is radiated toward the outside from a surface of the third substrate 430.

With such a structure, in the image sensor 203, the reference optical signal 330 that enters from one end of the core region 292 of the third substrate 430 and is propagated in the core region 292 is injected into each of the sub pixels 222 through each of the gratings 293. In the image-capturing apparatus 105, the incoming reflected light 320 reflected on the image-capturing target 99 is propagated approximately orthogonal to a surface of the image sensor 203. Thus, entrance of the reflected light 320 into the main pixels 221 of the image sensor 203 is never hindered by the slab-type optical waveguide 290.

Because in the image sensor 203 having the structure, the reference optical signal 330 reaches all the sub pixels 222 simultaneously, even if the image sensor 203 has an increased number of pixels or is increased in size, generation of delays in supply of the reference optical signal 330 in each of the detecting units 230 is prevented. Also, because the reference optical signal 330 reaches all among the plurality of detecting units 230 at the same signal level, variation in operational timing due to attenuation of the reference signal can be prevented even if the image sensor 203 has an increased number of pixels or is increased in size.

Furthermore, although in the image sensor 203, each of the main pixels 221 is disposed adjacent to the sub pixels 222, the grating 293 is not disposed in front of the main pixel 221. Thus, entrance of the reference optical signal 330 as noises into the main pixel 221 is prevented.

The detecting unit 230 can acquire a reference signal from a sub pixel 222 disposed in the light-receiving region 229 where a main pixel 221, which is a first light-receiving unit, is also disposed, and can perform synchronous detection. In this manner, because in the image sensor 203, a reference signal is supplied from a signal obtained from a sub pixel 222 that receives the reference optical signal 330, the length of a reference electrical signal propagation path can be kept short within a shorter-length range than a predetermined distance even if the image sensor 201 is increased in size or formed to have high resolution. Thus, even if the light-receiving unit 220 is increased in size or formed to have high resolution, the detecting unit 230 can acquire a reference signal that is less attenuated and less delayed, and can perform synchronous detection with high accuracy.

The image-capturing apparatuses 101 to 105 each include at least one of the modulated optical signal generating unit 210 and the reference optical signal generating unit 250 that generate the modulated optical signal 310 and the reference optical signal 330. However, the same functions as those of the image-capturing apparatuses 101 to 105 can be realized even if the modulated optical signal generating unit 210 to generate the modulated optical signal 310 is provided outside the image-capturing apparatuses 101 to 105, and the image-capturing apparatuses 101 to 105 are structured to be supplied with synchronized signals for use in synchronizing the reference optical signal 330 with the modulated optical signal 310.

Also, the image sensors 201, 202, 203 in the image-capturing apparatuses 101 to 105 have structures in which main pixels 221 and sub pixels 222 are present in a mixed manner on one substrate. However, main pixels 221 and sub pixels 222 may be formed on separate substrates, and the substrates may be stacked one on another to form an image sensor. Thereby, main pixels 221 and sub pixels 222 can be formed of light-receiving elements optimized for each of the modulated optical signal 310 and the reference optical signal 330.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image sensor comprising:
a first light-receiver that: receives a modulated optical signal having being reflected on an image-capturing target and including a modulated component with an intensity modulated at a predetermined modulation frequency and outputs a first electrical signal;
a second light-receiver that: receives a reference optical signal with an intensity modulated in synchronization with the modulated optical signal and outputs a second electrical signal; and
a detector that: is provided to a substrate stacked on a substrate including the first light-receiver, refers to the second electrical signal, and detects, from the first electrical signal, a third electrical signal corresponding to the modulated component.

2. The image sensor according to claim 1, wherein the detector has:
a multiplier that multiplies the first electrical signal and the second electrical signal; and
a lowpass filter that filters an output of the multiplier.

3. The image sensor according to claim 1, comprising separately a modulated optical signal generator that generates the modulated optical signal and a reference optical signal generator that generates the reference optical signal.

4. The image sensor according to claim 1, further comprising: an optical signal generator that generates an optical signal including the modulated optical signal and the reference optical signal; and a light-guide that guides part of the optical signal to the second light-receiver.

5. The image sensor according to claim 1, wherein the first light-receiver and the second light-receiver have mutually different light-receiving bands.

6. The image sensor according to claim 5, wherein the second light-receiver is more sensitive to a wavelength of the reference optical signal than the first light-receiver is.

7. The image sensor according to claim 1, wherein the second light-receiver receives a reference optical signal having a wavelength included in an absorbing band of water molecules.

8. The image sensor according to claim 1, wherein the second light-receiver has an optical signal introducing part through which the reference optical signal is introduced into the second light-receiver.

9. The image sensor according to claim 1, wherein the second light-receiver is disposed near the first light-receiver, and has an introducing part through which the reference optical signal is introduced selectively from the modulated optical signal and the reference optical signal.

10. The image sensor according to claim 9, wherein the second light-receiver has an optical element that guides the reference optical signal to the second light-receiver, and blocks an optical signal other than the reference optical signal from reaching the second light-receiver.

11. The image sensor according to claim 9, wherein the second light-receiver has a slab-type optical waveguide that guides the reference optical signal to the second light-receiver.

12. The image sensor according to claim 11, wherein the slab-type optical waveguide includes a grating arranged corresponding to the second light-receiver.

13. The image sensor according to claim 1, comprising:
a first substrate in which the first light-receiver is disposed; and
a second substrate in which the second light-receiver is disposed, and that is stacked on the first substrate.

14. An image-capturing apparatus comprising: the image sensor according to claim 1; and an optical system that forms an image of the image-capturing target on the image sensor.

15. The image-capturing apparatus according to claim 14, further comprising an optical signal generator that generates the modulated optical signal to be received by the first light-receiver.

16. The image-capturing apparatus according to claim 15, further comprising a reference signal generator that generates the reference optical signal to be received by the second light-receiver.

* * * * *